(12) United States Patent
Roche et al.

(10) Patent No.: US 7,370,159 B2
(45) Date of Patent: May 6, 2008

(54) MICROPROCESSOR HAVING AN EXTENDED ADDRESSABLE SPACE

(75) Inventors: Franck Roche, Trets (FR); Philippe Basset, Meylan (FR)

(73) Assignee: STMicroelectronics SA, Montrouge (FR)

( * ) Notice: Subject to any disclaimer, the term of this patent is extended or adjusted under 35 U.S.C. 154(b) by 324 days.

(21) Appl. No.: 10/814,823

(22) Filed: Mar. 31, 2004

(65) Prior Publication Data

US 2004/0243786 A1 Dec. 2, 2004

Related U.S. Application Data

(63) Continuation of application No. PCT/FR02/03481, filed on Oct. 11, 2002.

(30) Foreign Application Priority Data

Oct. 19, 2001 (FR) .................... 01 13478

(51) Int. Cl.
*G06F 12/14* (2006.01)
(52) U.S. Cl. .................... 711/152; 712/13; 712/220
(58) Field of Classification Search ................ 712/220, 712/13; 711/152
See application file for complete search history.

(56) References Cited

U.S. PATENT DOCUMENTS 5,423,013 A * 6/1995 Baum et al. ................ 711/163
5,566,308 A    10/1996 Bendelac et al. ........... 395/402
6,192,476 B1 *  2/2001 Gong ............................ 726/4
7,171,543 B1 *  1/2007 Ronen et al. ............... 712/209
2003/0204745 A1* 10/2003 Abrams ...................... 713/201

FOREIGN PATENT DOCUMENTS

EP 0530682 3/1993
WO 00/55723 9/2000

OTHER PUBLICATIONS

Suleman, Hussein. "Assembly Language". 1996, pp. 1-21.☐☐Obtained from: http://www.husseinsspace.com/teaching/udw/1996/asmnotes/.*
Galvin et al. "Operating System Concepts". John Wiley & Sons, Inc. Fourth Edition, 1995. pp. 30 and 45-49.*

* cited by examiner

*Primary Examiner*—Eddie Chan
*Assistant Examiner*—Robert E Fennema
(74) *Attorney, Agent, or Firm*—Lisa K. Jorgenson; Allen, Dyer, Doppelt, Milbrath & Gilchrist, P.A.

(57) ABSTRACT

A microprocessor includes a processing unit, an address bus connected to an addressable memory space, and executes instructions from an instruction set for accessing the addressable memory space. The addressable memory space is for a lower memory area and an extended memory area. The instruction set includes a first instruction group for accessing the lower memory area, and a second instruction group that is distinct from the first instruction group for accessing the extended memory area.

30 Claims, 4 Drawing Sheets

MICROPROCESSOR HAVING AN EXTENDED ADDRESSABLE SPACE

RELATED APPLICATION

The present application is a continuation of International Application No. PCT/FR02/03481 filed on Oct. 11, 2002, the entire disclosure of which is incorporated herein by reference.

FIELD OF THE INVENTION

The present invention relates to microprocessors, and in particular, to a method for accessing a memory used by a microprocessor.

BACKGROUND OF THE INVENTION

The memory used by microprocessors or microcontrollers generally comprises a plurality of memory locations, wherein each location may be used for storing data. For read or write access to a memory location, the microprocessor generates an address corresponding to the memory location and sends it over the address bus connecting the microprocessor to the memory. Consequently, a memory address should be composed of a sufficient number of bits for uniquely identifying each memory location accessible by the microprocessor. For example, a 64-kilobyte memory would require a 16-bit address for each memory location in the memory to be uniquely identified.

As the size of memories tend to increase at a constant cost, there is a need for increasing the size of the addressable space accessible by the microprocessor. For this purpose, the microprocessor should be provided with an address bus having the corresponding number of lines, which unavoidably leads to an increase in the microprocessor's complexity both in its structure and in its command register.

For increasing the microprocessor's addressable space without substantially enlarging its structure, it has already been suggested to integrate a page or segment register within the microprocessor's processing unit for storing the additional most significant bits. These bits are concatenated (i.e., linked together) with the addresses generated by the processing performed by the microprocessor.

However, for this approach to be implemented, additional commands have to be added to the microprocessor's command register to manage the page or segment register. In addition, this approach leads to a division of the space addressable by the microprocessor into relatively isolated blocks and introduces additional constraints in the compilers.

Another approach includes using indexes which are added to the addresses manipulated by the processing unit of the microprocessor. This results in a rather heavy additional processing for only a slight increase in the addressable space.

SUMMARY OF THE INVENTION

In view of the foregoing background, an object of the present invention is to provide a microprocessor with an extended addressing feature, which nevertheless remains compatible with microprocessors not having this feature, and thus does not require a modification to existing programs.

This and other objects, advantages and features in accordance with the present invention are provided a microprocessor comprising a processing unit, means for connecting to and accessing an addressable memory space, and means for executing instructions from an instruction set comprising instructions for accessing the memory space.

According to the present invention, the memory space addressable by the microprocessor preferably comprises a lower memory area and an extended memory area. The instruction set preferably comprises a first instruction group that includes instructions for accessing the lower memory area. The instruction set also preferably includes a second instruction group that is distinct from the first instruction group, and all of the instructions in the instruction set are gathered for accessing the extended memory area. The microprocessor may further comprise means for preventing any access to the extended memory area as long as the microprocessor executes instructions from the first instruction group.

According to one embodiment of the present invention, each location in the memory space may be associated with a respective access address. The microprocessor may comprise means for forcing the address of one location to be accessed to point to a location in the lower memory area when executing instructions from the first instruction group.

Advantageously, the second instruction group may only comprise jump and routine call instructions at an arbitrary memory location within the memory space, and instructions for transferring data between an arbitrary memory location within the memory space and a predefined internal register of the microprocessor.

Preferably, each location in the memory space is associated with a respective access address. For executing jump or routine call instructions from the first instruction group, in a direct addressing mode and from a location in the lower memory area, the microprocessor comprises means for maintaining the address of the jump destination location so that it points to a location within the lower memory area.

According to one embodiment of the present invention, the first instruction group may comprise indirect mode addressing instructions for accessing a location in the lower memory area. The microprocessor may further comprise means for forcing the address and the value of a pointer specifying an indirect mode access so that the latter will be located within the lower memory area and points into this area.

Alternatively, the second instruction group may comprise instructions for accessing the extended memory area in the indirect addressing mode. Preferably, in the indirect addressing mode of the extended memory area, the pointers determining the memory location address to be accessed reside in the lower memory area. Advantageously, in the indirect addressing mode of the extended memory area, the pointers that determine the address of the memory location to be accessed reside in the extended memory area.

According to yet another embodiment of the present invention, the microprocessor may comprise an address bus for accessing the addressable space, and a program pointer register with a size corresponding to that of the address bus. This enables access to a program instruction to be executed, which resides at an arbitrary location in the addressable space. The lower memory area may be accessible over 16 bits, and the extended memory area may be accessible over 24 bits, for example.

BRIEF DESCRIPTION OF THE DRAWINGS

These and other objects, features, and advantages of the present invention will become more readily apparent by referring to the following detailed and non-limiting description of a microprocessor, taken in conjunction with the accompanying drawings, where.

DETAILED DESCRIPTION OF THE PREFERRED EMBODIMENTS

Figure 1:
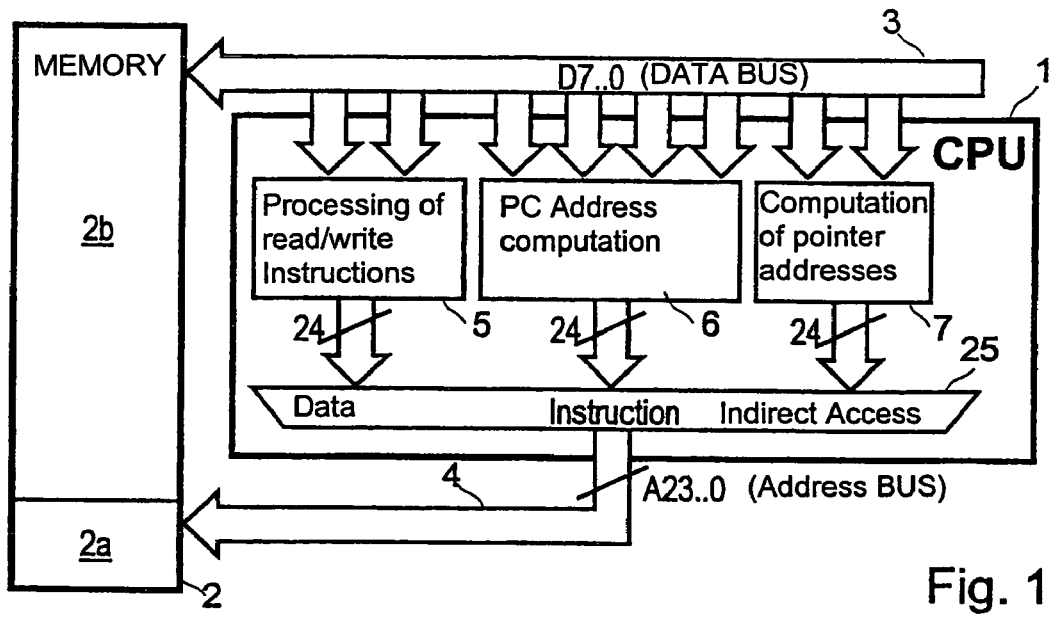
FIG. 1 schematically shows the addressing functions of the processing unit of the microprocessor according to the present invention.

The processing unit 1 of the microprocessor shown in FIG. 1 is connected through an address bus 4 and a data bus 3 to an addressable memory space in a memory 2. The memory 2 contains at least one program memory area and one data memory area distributed within the lower memory area 2a and an extended memory area 2b. This figure shows the main addressing functions performed by the processing unit as blocks, namely an addressing function 5 for read or write access to the data memory, a function 6 for determining the program pointer value during the execution of a program by the microprocessor, and a function 7 for determining the value of pointers used in the indirect addressing modes. The addresses determined by functions 5, 6 and 7 are input to a multiplexer 25, which selects one of these outputs according to the program instruction being executed.

Figure 2:
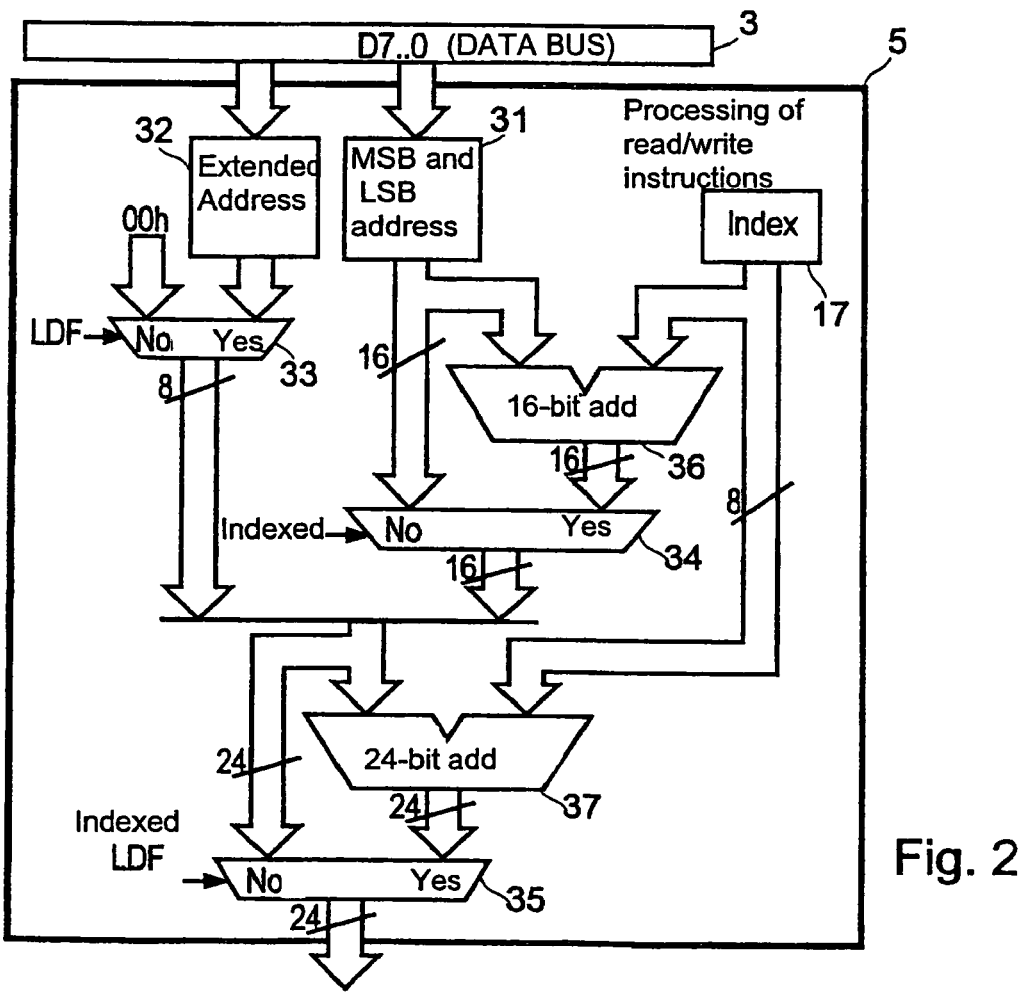
FIG. 2 shows in more detail, as a logic circuit diagram, the function for addressing a data item in the memory as performed by the processing unit shown in FIG. 1.

FIG. 2 shows function 5 for determining a memory address to transfer data between the data memory area and the microprocessor's internal registers. For this purpose, the processing unit 1 conventionally comprises a two-byte (16-bit) register 31 for receiving the address of the data to be read or written in the memory. The address is read from the program memory in combination with the transfer instruction code. The contents of register 31 are provided as the output of function 5.

According to the present invention, the space addressable by the microprocessor 1 is extended by increasing the size of address bus 4, such as from 16 to 24 bits (three bytes), for example. This provides access not only to the lower memory area 2a (from 000000h to 00FFFFh), but also to an extended memory area 2b (from 010000h to FFFFFFh) by introducing within the microprocessor's instruction set extended addressing modes which are accessible only to a limited number of instructions. These instructions are, for example, jump "JUMP", routine call "CALL", and transfer instructions "LOAD" and "STORE" for transferring data to or from the memory and an internal microprocessor register.

Therefore, the overall addressing space is only accessible to certain instructions LDF, JPF and CALLF which are added to the existing instruction set. This is so that the modified microprocessor remains compatible with programs written for the same microprocessor but not comprising these extended addressing modes.

In this respect, function 5 further comprises a one-byte register 32 for receiving the extended address byte (over 24 bits) of the memory location to be accessed. This byte is also associated with the transfer instruction code. The output of register 32 is input to a two-input multiplexer 33 having its other input forced to byte 00. The output of register 31 is supplied to the input of another multiplexer 34, and also to the input of a 16-bit adder 36 whose other input receives the contents of a one-byte index register 17.

The contents of registers 31 and 17 are added together to obtain a two-byte result. The output of adder 36 is connected to the input of multiplexer 34, which has its output concatenated with the output of multiplexer 33 so as to form a three-byte address. This address is input to a multiplexer 35 and to another 24-bit adder 37, whose other input is provided with the contents of the index register 17 and whose output is connected to the input of multiplexer 35. The output of multiplexer 35 corresponds to the output of function 5.

In case the instruction executed by the microprocessor is an instruction for transferring data between the memory and an internal register of the microprocessor or between two locations in memory 2, multiplexer 25 is controlled for selecting the output of function 5.

When executing a data transfer instruction in the non-extended direct addressing mode, multiplexers 33, 34 and 35 are controlled so as to provide as the output of function 5 the address stored in register 31 with the extended byte forced to 0. When executing a transfer instruction in the extended direct addressing mode LDF, multiplexers 33, 34 and 35 are controlled so as to provide the concatenated contents of registers 31 and 32 as the output of function 5.

In the non-extended indexed addressing mode, the contents of index register 17 are added to the contents of register 31 by adder 36. The addition result is selected by multiplexer 34 whose output is concatenated with a null byte selected by multiplexer 33. The address value thus obtained is provided as the output of function 5 by multiplexer 35. In the extended indexed addressing mode, multiplexers 33 and 34 are controlled so that the contents of registers 31 and 32 are concatenated and is provided as input to adder 37 for performing a 24-bit addition with the contents of index register 17. Multiplexer 35 provides the output of adder 37 as the output of function 5.

Figure 3:
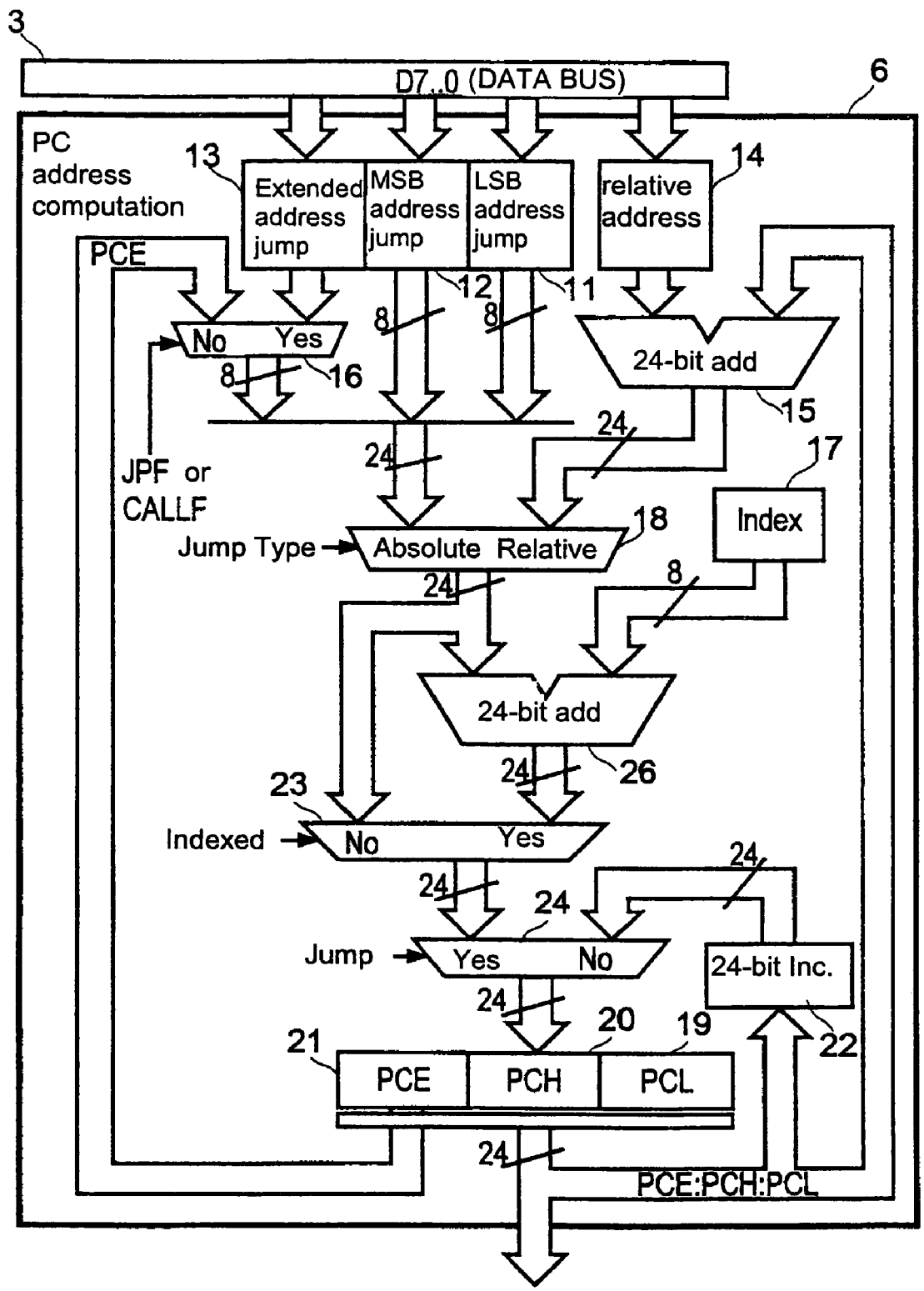
FIG. 3 shows in more detail, as a logic circuit diagram, the function for determining the program pointer value in the processing unit shown in FIG. 1.

FIG. 3 illustrates function 6 which is for determining the value of the register storing the program counter, that is, the address of the next instruction to be read from the program memory. In this figure, the processing unit conventionally comprises registers 11, 12 and 14 into which the jump addresses associated with the jump instructions are loaded from the data bus 3. Registers 11 and 12 are loaded with the most significant and least significant bytes, respectively, of jump address in the absolute or direct mode. The outputs of these two registers are concatenated and input to a first multiplexer 18. Also, the output of register 14 for receiving a jump value in the relative addressing mode, for example, over one byte, is connected via a 24-bit adder 15 to a second input of multiplexer 18.

The output of multiplexer 18 is connected to another 24-bit adder 26 having its other input connected to index register 17. The respective outputs of multiplexers 18 and adder 26 are connected to a second multiplexer 23 having its output connected to the input of a third multiplexer 24. The output of multiplexer 24 is connected to the input of registers 19 and 20 for storing the least and most significant bytes of the program counter PC. The output of the registers is the output of function 6. This output is looped back to a one-by-one incrementer 22 for incrementing the PC value so as to read the next instruction in the program being executed by the microprocessor, and to the input of adder 15 so that the value of the relative jump stored in register 14 may be added to the current value of the program counter.

To enable execution of program instructions residing in the extended memory area 2b, and jump or routine call instructions JPF, CALLF to or from this memory area, function 6 further comprises a third register 13 associated with registers 11 and 12 for storing the jump address. Register 13 is adapted to contain the extended byte of the jump address. The output of this register is connected to the input of a multiplexer 16 having its input concatenated with the output of the two other registers 11, 12 before it is input to multiplexer 18 whose inputs and outputs are 24-bit wide. Also, registers containing the program counter PC comprise a third register 21 for storing an extended byte of the program counter. The output of this register is concatenated with the two other PC registers 19 and 20 before it is provided as the output of function 6. Also, the output of register 21 is connected to the input of multiplexer 16. The respective outputs of incrementer 22 and adder 26 are also 24-bit wide so that the increment and add operations are performed over 24 bits.

In case the executed instruction is not a jump instruction, multiplexer 24 is instructed to select the output of incrementer 22 which is provided with the contents of PC registers 19, 20 and 21 and to supply a PC program pointer incremented by 1. The PC program pointer incremented by 1 is input to registers 19, 20 and 21 in order to read the next address in the program memory area. It should be noted that in the case of an existing program (running with a 16-bit addressable space), the value of register 21 remains at 0 at the output of incrementer 22.

In case the executed instruction is a jump instruction in the direct or absolute addressing mode, such an instruction comprises an instruction code associated with an address word. Two cases are distinguished according to whether the associated address uses two (non-extended direct addressing) or three bytes (extended direct addressing). In the non-extended direct addressing mode, multiplexer 16 is controlled so as to select the current value of register 21, which is concatenated with the output of the two registers 11 and 12 where the jump address is stored. Multiplexers 18, 23 and 24 are controlled so as to send this concatenated address to registers 19, 20 and 21 of the program pointer, and to send it thereafter as the output of function 6.

Thus, when the microprocessor executes a jump instruction in the non-extended direct mode, the value of the extended PC register 21 remains unchanged, while the two other registers 19 and 20 of the program pointer are modified and loaded from the data bus 3 through registers 11 and 12.

In the extended direct addressing mode, multiplexer 16 is controlled so as to select the output of register 13 where the extended byte of the jump address is stored so as to concatenate it with the output of the two other registers 11 and 12 in which the least and most significant bytes of the jump address are stored. The extended value of the thus formed jump address is sent to PC registers 19, 20 and 21 via multiplexers 18, 23 and 24.

In case the executed instruction is a jump instruction in the relative addressing mode, the jump value stored in register 14 is added by adder 15 to the value of the program pointer stored in registers 19, 20 and 21. The obtained result is 24-bit wide. Multiplexers 18, 23 and 24 are controlled so as to input the output of adder 19 to PC registers 19, 20 and 21. It should be noted that in the case of an existing program, the addition performed by adder 15 does not modify the contents of register 21, which remain at 0.

In case the executed instruction is a jump instruction in the absolute or relative and indexed addressing mode, the value of index register 17 is added during a 24-bit addition performed by adder 26 to the address output by multiplexer 18. Multiplexers 23 and 24 are controlled so as to load the address output by adder 26 into PC registers 19, 20 and 21.

It should be noted that the size of index register 17 used in functions 5 and 6 may advantageously be extended from 8 to 16 bits without changing the structure of the logical circuits shown in FIGS. 2 and 3. In FIG. 3, the size of this register may even be increased to 24 bits without having to modify the circuit.

Figure 4:
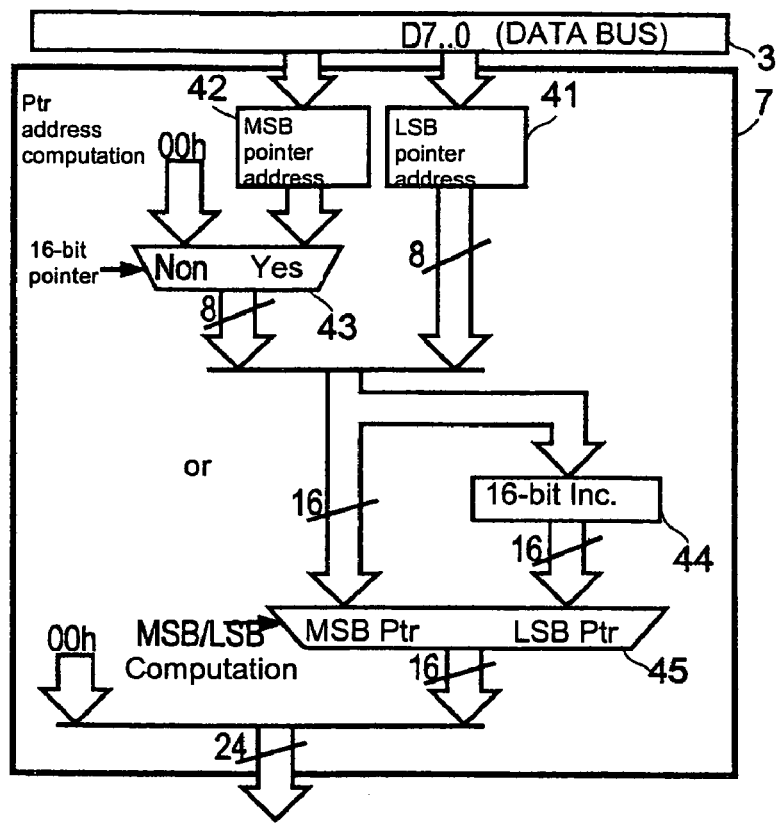
FIGS. 4 to 6 show in more detail, as logic circuit diagrams, three modifications of the function for determining the pointer value used in the indirect addressing mode in the processing unit shown in FIG. 1.
Figure 6:
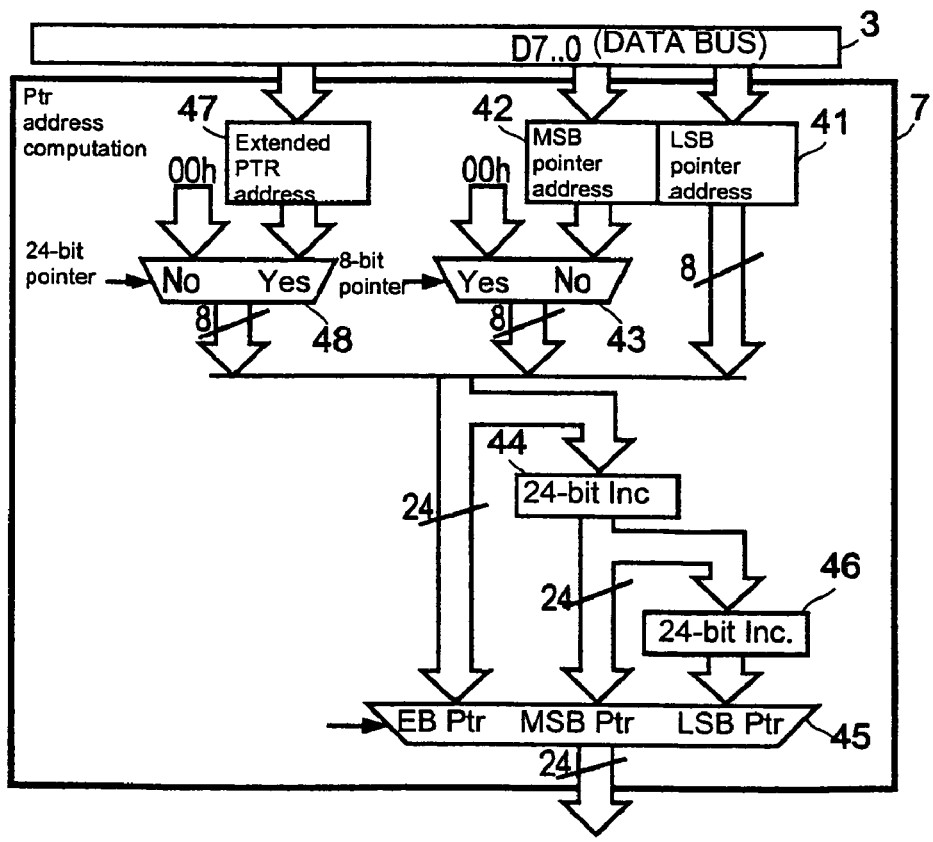
Figure 5:
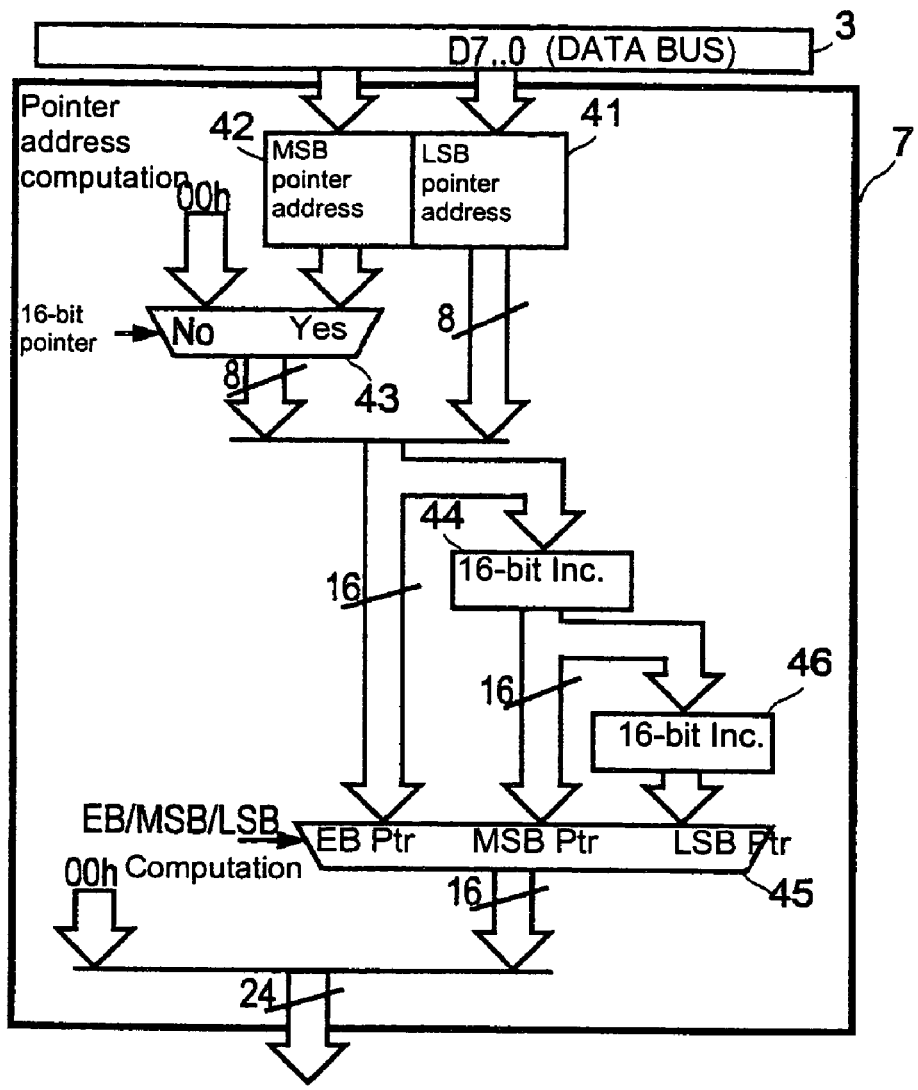

FIGS. 4 to 6 show three modifications of function 7 which allow pointer computations to be performed so as to make indirect addressing modes available. The obtained pointer values are then used as the inputs of functions 5 or 6.

In the simplified modification shown in FIG. 4, this pointer computation function 7 is not modified for microprocessors that have a 16-bit address bus, which implies that all pointers manipulated by the microprocessor according to the present invention should be placed in the non-extended memory area 2a (addresses ranging from 000000h to 00FFFFh). This function comprises, as is conventional, two 1-byte registers 41, 42 which are respectively loaded with the least and most significant bytes of the pointer to be processed. The output of the MSB register 42 is connected to a multiplexer 43 having its other input forced to 00h and its output concatenated with the output of the LSB address register 41. The value concatenated over 16 bits is applied to a second multiplexer 41 and to a 16-bit incrementer 44. The output of the incrementer is connected to another input of multiplexer 44.

According to the present invention, for this function to be compatible with a 24-bit address bus, the output of the 16-bit multiplexer 44 is padded with a null byte in order to form a 24-bit address. In the case of a 8-bit pointer address located within the 256 ($2^8$) first bytes of the addressable memory, multiplexer 43 is controlled so as to pad the contents of register 41 with a null byte. On the fist iteration, multiplexer 45 is instructed to send, as the output of function 7, the address of the MSB byte of the pointer given by the contents of register 41 padded with a null byte. On the second iteration, the address of the pointer's MSB byte is incremented by incrementer 44 and then sent as the output of function 7. In the case of a 16-bit pointer address, the respective contents of registers 41 and 42 are concatenated and input to multiplexer 45 and incrementer 44.

In order to load registers 11, 12 and 13 with the three consecutive bytes of a 24-bit pointer, function 7 as shown in FIG. 4 may be modified as shown in FIG. 5. In this figure, function 7 comprises another 16-bit incrementer 46 having its input connected to the output of incrementer 44. In addition, multiplexer 45 has a third input connected to the output of the second incrementer 46. On the first iteration, multiplexer 45 is instructed to select the 16-bit address of the pointer's extended byte which is provided by registers 41 and 42. On the second iteration, this address is incremented by incrementer 44 in order to compute the pointer's MSB byte address, and is selected by multiplexer 45. On the third iteration, the address of the pointer's MSB byte is incremented in incrementer 46 in order to obtain the pointer's MSB byte. This value is selected by multiplexer 45. These three 16-bit addresses are sent sequentially to address bus 4 after having been padded with a 00h byte in order to be 24-bit wide.

Function 7, as shown in FIGS. 4 and 5, enables processing of pointers residing in the lower memory area 2a, that is, at a 1- or 2-byte address. Of course, this function may still be modified as shown in FIG. 6 in order to make it possible to access pointers residing in the extended memory area 2b, that is, at a three-byte address. In this regard, it is sufficient to provide a third register 47 which is loaded with the pointer's extended byte from data bus 3, and another multiplexer 48 for selecting either the contents of register 47, or byte 00h in case the pointer to be processed is 16-bit wide. Furthermore, incrementer 44, and possibly 46, as well as multiplexer 47, should be 24-bit wide. The output of the latter directly provides the output of function 7. The respective outputs of register 41 and multiplexers 43 and 48 are concatenated for forming a 24-bit word which is sent to multiplexer 45 and then to incrementer 44, and possibly from there to incrementer 46.

These provisions advantageously enable access to a substantially increased addressable space (by a factor 256 if the address bus is extended by one byte), while involving only a few additional instruction codes and little additional logic. This is also while remaining compatible with programs written for an identical microprocessor only able to access a 16-bit addressable space.

To preserve compatibility with programs written for an addressable space restricted to the lower memory area 2a, it is sufficient to preserve the interrupt vector table, and in particular, the reset interrupt vector in the lower memory area, and to maintain the interrupt routines which are pointed to by the interrupt vectors within this memory area. In this way, the extended PC register 21 is at 00h when the microprocessor starts up and remains at this value for as long as no JPF or CALLF instructions are executed.

In case the microprocessor according to the present invention encounters an instruction that accesses direct addressing mode data within such a program, the extended portion of the data address is forced to 0 by multiplexer 33 of FIG. 2. In case the microprocessor encounters a non-extended jump or routine call instruction, multiplexer 16 (FIG. 3) is controlled so as not to modify the extended portion PCE of PC register with the contents of register 13.

Moreover, if it is desired to call a subroutine from a program designed for the microprocessor according to the present invention, which is written for a microprocessor not including means for accessing an extended addressable space, this program resides in the lower memory area 2a, and it is sufficient to use the CALLF instruction with a 24-bit routine whose extended byte is 0. In this way, multiplexer 16 is controlled so that the extended portion 21 of the PC register is set at 0 from register 13.

The above description shows an example wherein the address bus 4 of the microprocessor is increased from 16 to 24 bits. Of course, any other size of the address bus may be used, for example 20 or 32 bits, while remaining within the scope of the present invention as defined in the appended claims.

That which is claimed is:

1. A microprocessor comprising:
   a processing unit;
   a memory comprising a lower memory area and an extended memory area;
   an address bus connecting said processing unit to said memory, and comprising a lower address bus for accessing said lower memory area, and an extended address bus for accessing said extended memory area;
   means for executing instructions of an instruction set executable by said microprocessor, the instruction set comprising instructions for accessing said memory, a first instruction group comprising a first set of operation codes for accessing said lower memory area, and a second instruction group comprising a second set of operation codes different than the first set of operation codes for accessing said extended memory area; and
   means for forcing to zero an extended address transmitted by said extended address bus when executing an instruction in the first instruction group so that said lower memory area is accessed.

2. A microprocessor according to claim 1, wherein each location in said memory is associated with a respective access address; the microprocessor further comprising means for forcing an access address of a location to be accessed to point to a location in said lower memory area when executing an instruction in the first instruction group.

3. A microprocessor according to claim 1, further comprising at least one internal register; and wherein the second instruction group comprises:
   jump and routine call instructions at an arbitrary memory location in said memory; and
   data transfer instructions between the arbitrary memory location and said at least one internal register.

4. A microprocessor according to claim 1, wherein each location in said memory is associated with a respective access address; and for executing jump or routine call instructions from the first instruction group in a direct addressing mode from a location in said lower memory area, the microprocessor further comprising means for maintaining an address of a jump destination location so that it points to a location in said lower memory area.

5. A microprocessor according to claim 1, wherein the first instruction group comprises indirect mode addressing instructions for accessing a location in said lower memory area; the microprocessor further comprising means for forcing an address and a value of a pointer that specifies access in the indirect mode so that the pointer is located in said lower memory area and points to this area.

6. A microprocessor according to claim 1, wherein the second instruction group comprises instructions for accessing said extended memory area in an indirect addressing mode.

7. A microprocessor according to claim 6, wherein in the indirect addressing mode of said extended memory area, pointers that determine an address of a memory location to be accessed are located in said lower memory area.

8. A microprocessor according to claim 6, wherein in the indirect addressing mode of said extended memory area, pointers that determine an address of a memory location to be accessed are located within said extended memory area.

9. A microprocessor according to claim 1, further comprising a program pointer register having a size corresponding to a size of said address bus for enabling access to a program instruction to be executed that is located at an arbitrary location in said memory.

10. A microprocessor according to claim 1, wherein said lower memory area is accessible over 16 bits and said extended memory area is accessible over 24 bits.

11. A microprocessor comprising:
    a processing unit;
    a memory comprising a lower memory area and an extended memory area;
    an address bus connecting said processing unit to said memory, and comprising a lower address bus for accessing said lower memory area, and an extended address bus for accessing said extended memory area;
    a set of instructions executable by said processing unit, the set of instructions comprising
    a first instruction group comprising a first set of operation codes for accessing said lower memory area, and a second instruction group comprising a second set of operation codes different than the first set of operation codes for accessing said extended memory area; and a circuit for forcing to zero an extended address transmitted by said extended address bus when executing an instruction in the first instruction group so that said lower memory area is accessed.

12. A microprocessor according to claim 11, wherein each location in said memory is associated with a respective access address; the microprocessor further comprising means for forcing an access address of a location to be accessed to point to a location in said lower memory area when executing an instruction in the first instruction group.

13. A microprocessor according to claim 11, further comprising at least one internal register; and wherein the second instruction group comprises:
   jump and routine call instructions at an arbitrary memory location in said memory; and
   data transfer instructions between the arbitrary memory location and said at least one internal register.

14. A microprocessor according to claim 11, wherein each location in said memory is associated with a respective access address; and for executing jump or routine call instructions from the first instruction group in a direct addressing mode from a location in said lower memory area, said instruction set further comprises instructions for maintaining an address of a jump destination location so that it points to a location in said lower memory area.

15. A microprocessor according to claim 11, wherein the first instruction group comprises indirect mode addressing instructions for accessing a location in said lower memory area; and wherein said instruction set further comprises instructions for forcing an address and a value of a pointer that specifies access in the indirect mode so that the pointer is located in said lower memory area and points to this area.

16. A microprocessor according to claim 11, wherein the second instruction group comprises instructions for accessing said extended memory area in an indirect addressing mode.

17. A microprocessor according to claim 16, wherein in the indirect addressing mode of said extended memory area, pointers that determine an address of a memory location to be accessed are located in said lower memory area.

18. A microprocessor according to claim 16, wherein in the indirect addressing mode of said extended memory area, pointers that determine an address of a memory location to be accessed are located within said extended memory area.

19. A microprocessor according to claim 11, further comprising a program pointer register having a size corresponding to a size of said address bus for enabling access to a program instruction to be executed that is located at an arbitrary location in said memory.

20. A microprocessor according to claim 11, wherein said lower memory area is accessible over 16 bits and said extended memory area is accessible over 24 bits.

21. A method for accessing a memory used by a microprocessor, the memory comprising a lower memory area and an extended memory area, the microprocessor comprising a processing unit, an address bus for connecting the processing unit to the memory and comprising a lower address bus for accessing the lower memory area and an extended address bus for accessing the extended memory area, the method comprising:

executing an instruction for accessing the lower memory area, the instruction belonging to an instruction set comprising a first instruction group comprising a first set of operation codes for accessing the lower memory area, and a second instruction group comprising a second set of operation codes different than the first set of operation codes for accessing the extended memory area; and forcing to zero an extended address transmitted by said extended address bus when executing an instruction in the first instruction group so that said lower memory area is accessed.

22. A method according to claim 21, wherein each location in the memory is associated with a respective access address; the method further comprising forcing an access address of a location to be accessed to point to a location in the lower memory area when executing an instruction in the first instruction group.

23. A method according to claim 21, wherein the microprocessor further comprises at least one internal register; and wherein the second instruction group comprises:
   jump and routine call instructions at an arbitrary memory location in the memory; and
   data transfer instructions between the arbitrary memory location and the at least one internal register.

24. A method according to claim 21, wherein each location in the memory is associated with a respective access address; and for executing jump or routine call instructions from the first instruction group in a direct addressing mode from a location in the lower memory area; the method comprising maintaining an address of a jump destination location so that it points to a location in the lower memory area.

25. A method according to claim 21, wherein the first instruction group comprises indirect mode addressing instructions for accessing a location in the lower memory area; the method further comprising forcing an address and a value of a pointer that specifies access in the indirect mode so that the pointer is located in the lower memory area and points to this area.

26. A method according to claim 21, wherein the second instruction group comprises instructions for accessing the extended memory area in an indirect addressing mode.

27. A method according to claim 26, wherein in the indirect addressing mode of the extended memory area, pointers that determine an address of a memory location to be accessed are located in the lower memory area.

28. A method according to claim 26, wherein in the indirect addressing mode of the extended memory area, pointers that determine an address of a memory location to be accessed are located within the extended memory area.

29. A method according to claim 21, wherein the microprocessor further comprises a program pointer register having a size corresponding to a size of the address bus for enabling access to a program instruction to be executed that is located at an arbitrary location in the memory.

30. A method according to claim 21, wherein the lower memory area is accessible over 16 bits and the extended memory area is accessible over 24 bit.

* * * * *